(12) United States Patent
Tsushima et al.

(10) Patent No.: US 6,558,846 B1
(45) Date of Patent: May 6, 2003

(54) SECONDARY POWER SOURCE

(75) Inventors: Manabu Tsushima, Yokohama (JP); Takeshi Morimoto, Yokohama (JP); Yong Che, Yokohama (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/266,871

(22) Filed: Mar. 12, 1999

(30) Foreign Application Priority Data

Mar. 17, 1998 (JP) .......................................... 10-067386
Jul. 27, 1998 (JP) .......................................... 10-211486

(51) Int. Cl.⁷ .............................. H01M 4/48; H01M 4/60
(52) U.S. Cl. .................................. 429/231.8; 429/231.1
(58) Field of Search ........................... 429/231.1, 231.8, 429/217, 231.3, 224, 223; 29/623.1

(56) References Cited

U.S. PATENT DOCUMENTS

| | | | |
|---|---|---|---|
| 3,770,506 A | * | 11/1973 | Rightmire et al. |
| 3,811,947 A | * | 5/1974 | Metcalfe, III et al. |
| 5,079,674 A | * | 1/1992 | Malaspina .................. 361/502 |
| 5,278,000 A | * | 1/1994 | Huang et al. .................. 429/91 |
| 5,284,722 A | | 2/1994 | Sugeno |
| 5,536,597 A | * | 7/1996 | Takahashi et al. |
| 5,622,793 A | * | 4/1997 | Iijima et al. |
| 5,795,680 A | | 8/1998 | Ikeda et al. .................. 429/245 |
| 5,900,385 A | * | 5/1999 | Dahn et al. .................. 502/302 |
| 5,953,204 A | | 9/1999 | Suhara et al. |
| 6,294,292 B1 | | 9/2001 | Tsushima et al. |

FOREIGN PATENT DOCUMENTS

| | | |
|---|---|---|
| EP | 0 871 233 | 10/1998 |
| EP | 0 874 410 | 10/1998 |
| JP | 0090971 | * 3/2000 |
| JP | 0106218 | * 4/2000 |
| JP | 0138074 | * 5/2000 |
| JP | 0138142 | * 5/2000 |
| WO | WO 97/01191 | 1/1997 |

OTHER PUBLICATIONS

G. Pistoia. Lithium Batteries: New Materials, Developments and Perspective. pp. 95 1–9. 1994 (no month).*
Patent Abstracts of Japan, vol. 013, No. 160 (E–744), Apr. 18, 1989, JP 63–314766, Dec. 22, 1988.
Patent Abstracts of Japan, vol. 012, No. 030 (E–578), Jan. 28, 1998, JP 62–188167, Aug. 17, 1987.
Patent Abstracts of Japan, vol. 017, No. 219 (E–1358), Apr. 30, 1993, JP 04–355057, Dec. 9, 1992.

* cited by examiner

*Primary Examiner*—Carol Chaney
*Assistant Examiner*—Tracy Dove
(74) *Attorney, Agent, or Firm*—Oblon, Spivak, McClelland, Maier & Neustadt, P.C.

(57) ABSTRACT

A secondary power source, which comprises a positive electrode containing activated carbon and a lithium-containing transition metal oxide, a negative electrode containing a carbon material capable of doping and undoping lithium ions, and an organic electrolyte containing a lithium salt.

14 Claims, No Drawings

SECONDARY POWER SOURCE

BACKGROUND OF THE INVENTION

The present invention relates to a secondary power source having a low resistance, a high upper limit voltage and a large capacity. More particularly, the present invention relates to a secondary power source having a high reliability for quick charge and discharge cycles.

DISCUSSION OF THE BACKGROUND

As electrodes for a conventional electric double layer capacitor, polarizable electrodes composed mainly of activated carbon are used for both the positive electrode and the negative electrode. The upper limit voltage of an electric double layer capacitor is 1.2 V when an aqueous electrolyte is used, or from 2.5 to 3.3 V when an organic electrolyte is used. The energy of the electric double layer capacitor is proportional to the square of the upper limit voltage. Accordingly, an organic electrolyte having a high upper limit voltage provides a high energy as compared with an aqueous electrolyte. However, even with an electric double layer capacitor employing an organic electrolyte, the energy density is as low as at most 1/10 of a secondary cell such as a lead storage battery, and further improvement of the energy density is required.

Whereas, JP-A-64-14882 proposes a secondary power source for an upper limit voltage of 3 V, which employs, as a negative electrode, an electrode having lithium ions preliminarily doped in a carbon material having a spacing of [002] face of from 0.338 to 0.356 nm as measured by X-ray diffraction. Further, JP-A-8-107048 proposes a battery which employs, for a negative electrode, a carbon material having lithium ions preliminarily doped by a chemical method or by an electrochemical method in a carbon material capable of doping and undoping lithium ions. Still further, JP-A-9-55342 proposes a secondary power source for an upper limit voltage of 4 V, which has a negative electrode having a carbon material capable of doping and undoping lithium ions supported on a porous current collector which does not form an alloy with lithium. However, these secondary power sources have had a problem from the viewpoint of the process for their production which requires preliminary doping of lithium ions.

Further, a lithium ion secondary cell is available as a power source capable of heavy current charge and discharge other than the electric double layer capacitor. The lithium ion secondary cell has characteristics such that it provides a high voltage and a high capacity as compared with the electric double layer capacitor. However, it has had problems such that the resistance is high, and the useful life due to quick charge and discharge cycles is very short as compared with the electric double layer capacitor.

Under these circumstances, it is an object of the present invention to provide a secondary power source which has quick charge and discharge capability, provides a high upper limit voltage and a high capacity and has a high energy density and which has a high charge and discharge cycle reliability.

BRIEF SUMMARY OF THE INVENTION

The present invention provides a secondary power source, which comprises a positive electrode containing activated carbon and a lithium-containing transition metal oxide, a negative electrode containing a carbon material capable of doping and undoping lithium ions, and an organic electrolyte containing a lithium salt.

DETAILED DESCRIPTION OF THE INVENTION

Now, the present invention will be described in detail with reference to the preferred embodiments.

In this specification, a negative electrode assembly is one obtained by bonding and integrating a current collector and a negative electrode composed mainly of a carbon material capable of doping and undoping lithium ions. Likewise, a positive electrode assembly is one obtained by bonding and integrating a current collector and the positive electrode. A secondary cell as well as an electric double layer capacitor is a kind of a secondary power source. However, in this specification, a secondary power source of a specific construction wherein the positive electrode contains activated carbon and the negative electrode contains a carbon material capable of doping and undoping lithium ions, will be referred to simply as a secondary power source.

With the secondary power source of the present invention, at the time of charging, at the positive electrode, in addition to the adsorption of anions of the lithium salt to the activated carbon, undoping of lithium ions from the lithium-containing transition metal oxide takes place. At the negative electrode, lithium ions will be doped in the carbon material. Here, the lithium ions to be doped in the carbon material are those from the lithium salt in the electrolyte and those undoped from the lithium-containing transition metal oxide.

Accordingly, with the secondary power source of the present invention, lithium ions can adequately be doped in the carbon material of the negative electrode, as compared with a conventional secondary power source employing a positive electrode composed mainly of activated carbon without containing a lithium-containing transition metal oxide. Therefore, an adequate amount of lithium ions can be doped in the negative electrode by charging after the positive electrode and the negative electrode facing each other with a separator interposed therebetween, are impregnated with the electrolyte, without necessity to preliminarily occlude lithium ions to the negative electrode as required in the above-mentioned conventional secondary power sources. And, the potential of the negative electrode becomes low enough, so that the voltage of the secondary power source can be made high.

With a lithium ion secondary cell wherein the positive electrode is made of an electrode composed mainly of a lithium-containing transition metal oxide, and the negative electrode is made of an electrode composed mainly of a carbon material capable of doping and undoping lithium ions, deterioration is remarkable when quick charge and discharge cycles are carried out as compared with a case where mild charge and discharge cycles are carried out. One of the main causes is deterioration by an oxidation-reduction reaction due to the charge and discharge of the lithium-containing transition metal oxide as the active material of the positive electrode.

Whereas, with the secondary power source of the present invention, when an adequate amount of the lithium-containing transition metal oxide is contained in the positive electrode, the activated carbon will be involved in the case of quick charge and discharge with a heavy current, and the lithium-containing transition metal oxide will be involved in the case of charge and discharge with a relatively small current. Accordingly, the lithium-containing transition metal oxide of the positive electrode is less burdened, whereby the deterioration due to charge and discharge cycles can be reduced to a low level, and it is possible to obtain a secondary power source having a high voltage, a high capacity and a long useful life for charge and discharge cycles.

Further, if the amount of the lithium-containing transition metal oxide contained in the positive electrode in the secondary power source of the present invention is reduced, only the activated carbon will substantially be involved in the charge and discharge irrespective of the current level. In such a case, the substantial role of the lithium-containing transition metal oxide will be to provide lithium ions to be doped in the carbon material of the negative electrode during the initial charge, and to supplement lithium ions when lithium ions in the electrolyte have decreased by the use of the secondary power source. Accordingly, the deterioration in,the capacity due to the charge and discharge cycles will be particularly small, although the capacity may be small as compared with a case where the content of the lithium-containing transition metal oxide is/large.

The amount of the lithium-containing transition metal oxide in the positive electrode is preferably from 0.1 to 80 wt %. If it is less than 0.1 wt %, the amount of lithium ions undoped in the initial charge tends to be inadequate relative to the amount of lithium ions which may be doped in the negative electrode, whereby the voltage of the secondary power source can not be made high. If it exceeds 80 wt %, the amount of activated carbon in the positive electrode will correspondingly be small, whereby the decrease in the capacity in the charge and discharge cycles will be large. Especially when a large capacity is of importance and a lithium-containing transition metal oxide is involved for the charge and discharge with a small current, the amount of the lithium-containing transition metal oxide is preferably from 20 to 70 wt %. Further, in order to increase the durability of the secondary power source by reducing the decrease in the capacity in the charge and discharge cycles, it is preferably from 0.1 to 15 wt % particularly preferably from 1 to 10 wt %.

The lithium-containing transition metal oxide to be contained in the positive electrode, is preferably a compound oxide of lithium and at least one transition metal selected from the group consisting of V, Mn, Fe, Co, Ni, Zn and W. Particularly preferred is a compound oxide of lithium and at least one member selected from the group consisting of Mn, Co and Ni. More preferred is $Li_xCo_yNi_{1-y}O_2$ or $Li_zMn_2O_4$, wherein $0<x<2$, $0 \leq y \leq 1$, and $0<z<2$.

The activated carbon contained in the positive electrode preferably has a specific surface area of from 800 to 3,000 $m^2/g$, more preferably from 900 to 2100 $m^2/g$. The starting material and the activation conditions for the activated carbon are not particularly limited. For example, the starting material may be a phenol resin or a petroleum coke, and the activation method may, for example, be a steam-activation method, or a molten alkali activation method. Particularly preferred is activated carbon obtained by steam activation using, as the starting material, a coconut shell or a phenol resin. In order to reduce the resistance of the positive electrode, it is preferred to incorporate conductive carbon black or graphite as a conductive material to the positive electrode. In such a case, the conductive material is preferably from 0.1 to 20 wt % in the positive electrode.

As a method for preparing the positive electrode assembly, a method may, for example, be mentioned wherein polytetrafluoroethylene is mixed and kneaded, as a binder, to a mixture comprising an activated carbon powder and a lithium-containing transition metal oxide powder, followed by forming into a sheet shape to obtain a positive electrode, which is then bonded to a current collector by means of a conductive adhesive. Otherwise, an activated carbon powder and a lithium-containing transition metal oxide powder may be dispersed in a varnish having polyvinylidene fluoride, polyamideimide or polyimide dissolved as a binder, and the dispersion may be coated on a current collector by e.g. a doctor blade method, followed by drying. The amount of the binder contained in the positive electrode is preferably from 1 to 20 wt % from the viewpoint of the balance between the strength of the positive electrode assembly and the properties such as the capacity.

In the present invention, the carbon material capable of doping and undoping lithium ions preferably has a spacing of [002] of from 0.335 to 0.410 nm, particularly preferably from 0.335 to 0.338 nm, as measured by X-ray diffraction. The carbon material having a spacing exceeding 0.410 nm, tends to deteriorate in the charge and discharge cycles. Specifically, a material obtained by heat treating petroleum coke, a meso phase pitch-type carbon material or a gas-phase grown carbon fibers at a temperature of from 800 to 3,000° C., natural graphite, artificial graphite or a hard (hardly graphitizable) carbon material, may, for example, be mentioned. In the present invention, any one of such materials may be preferably employed.

In the case where a carbon material obtained by low temperature treatment of e.g a hard carbon material or a petroleum coke, is to be used, it is preferred to use it in admixture with a graphite type carbon material such as a material obtained by graphitizing e.g. a gas phase grown carbon, whereby the resistance can be reduced. In such a case, the weight ratio of the hard carbon material or the petroleum coke to the graphite type carbon material is preferably from 95:5 to 70:30. If the graphite type carbon material is less than 5%, no adequate effect for reducing the resistance can be obtained, and if it exceeds 30%, the capacity of the negative electrode tends to be low.

The negative electrode assembly in the present invention can be obtained in such a manner that polytetrafluoroethylene is mixed and kneaded as a binder with a material capable of doping and undoping lithium ions, in the same manner as for the layer containing the activated carbon, followed by forming into a sheet shape to obtain a negative electrode, which is then bonded to a current collector by means of a conductive adhesive. Otherwise, a method may be employed wherein polyvinylidene fluoride, polyamideimide or polyimide is used as a binder, and the above-mentioned carbon material is dispersed in a solution having the resin for the binder or its precursor dissolved in an organic solvent, and the dispersion is coated on the current collector, followed by drying. These methods are both preferred.

In the method for coating the negative electrode layer on the current collector, the solvent for dissolving the resin for the binder or its precursor, is not particularly limited. However, N-methyl-2-pyrrolidone (hereinafter referred to as NMP) is preferred, since it is readily available and capable of readily dissolving the resin constituting the binder or its precursor. Here, the precursor for polyamideimide or the precursor for polyimide means one which will be converted to polyamideimide or polyimide, respectively, by polymerization under heating.

The binder obtained as described above will be cured by heating and is excellent in the chemical resistance, the mechanical properties and the dimensional stability. The temperature for the heat treatment is preferably at least 200° C. At a temperature of at least 200° C., even the precursor of polyamideimide or the precursor of polyimide will usually be polymerized to form polyamideimide or polyimide, respectively. The atmosphere for the heat treatment is preferably an inert atmosphere of e.g. nitrogen or argon or under a reduced pressure of at most 1 torr. The polyamideimide or the polyimide is resistant to the organic electrolyte to be used in the present invention and also has adequate resistance against heating at a high temperature at a level of 300° C. to remove moisture from the negative electrode or against heating under reduced pressure.

In the present invention, an adhesive layer made of polyamideimide or polyimide may be interposed between the negative electrode and the current collector to further increase the bond strength between the negative electrode and the current collector. In such a case, a varnish having polyamideimide, polyimide or a precursor thereof dissolved in a solvent, may preliminarily be coated on the current collector by e.g. a doctor blade method and dried to form an adhesive layer, and a negative electrode may be formed on the adhesive layer. Further, it is preferred to have a conductive material such as copper or graphite dispersed in the varnish to form the adhesive layer, since it is thereby possible to reduce the contact resistance between the negative electrode and the current collector. The varnish containing such a conductive material may also be interposed as a conductive adhesive between the layer containing activated carbon and the current collector in a case where the layer containing activated carbon is formed into a sheet shape.

The lithium salt contained in the organic electrolyte in the present invention is preferably at least one member selected from the group consisting of $LiPF_6$, $LiBF_4$, $LiClO_4$, $LiN(SO_2CF_3)_2$, $CF_3SO_3Li$, $LiC(SO_2CF_3)_3$, $LiAsF_6$ and $LiSbF_6$. The solvent preferably contains at least one member selected from the group consisting of ethylene carbonate, propylene carbonate, butylene carbonate, dimethyl carbonate, ethylmethyl carbonate, diethyl carbonate, sulfolane and dimethoxyethane. An electrolyte comprising such a lithium salt and a solvent has a high upper limit voltage and a high electrical conductivity. The concentration of the lithium salt is preferably from 0.1 to 2.5 mol/l, more preferably from 0.5 to 2 mol/l.

Now, the present invention will be described in further detail with reference to Examples (Examples 1 to 6 and Examples 9 to 15) and Comparative Examples (Examples 7 and 8, and Examples 16 and 17) However, it should be understood that the present invention is by no means restricted by such Examples. The preparation of cells and the measurements in Examples 1 to 16 were carried out in an argon glove box with a dewpoint of at most −60° C. in all cases.

EXAMPLE 1

A mixture comprising 40 wt % of activated carbon having a specific surface area of 2,000 $m^2/g$ obtained by steam-activation using a phenol resin as the starting material, 40 wt % of $LiCoO_2$, 10 wt % of conductive carbon black and 10 wt % of polytetrafluoroethylene as a binder, was added to ethanol, followed by kneading, rolling and drying in vacuum at 200° C. for two hours to obtain an electrode sheet. This sheet was bonded to an aluminum foil by means of a conductive adhesive using polyamideimide as a binder, followed by heat treatment at 300° C. for two hours under reduced pressure, to obtain a positive electrode assembly. The electrode area was 1 $cm^2$, and the thickness of the electrode sheet was 180 $\mu$m.

Then, a petroleum coke base carbon material was heat-treated at a temperature of 1,000° C. to obtain a carbon material capable of doping and undoping lithium ions. The spacing of [002] face of this carbon material was 0.341 nm as measured by X-ray diffraction. In the same manner as for the positive electrode, the carbon material was formed into a sheet using polytetrafluoroethylene as a binder and then bonded to a current collector made of copper by means of a conductive adhesive. The electrode area was 1 $cm^2$, and the thickness of the electrode sheet was 60 $\mu$m.

The positive electrode assembly and the negative electrode assembly were disposed to face each other with a polypropylene separator interposed therebetween to obtain an element of 1 $cm^2$. A solution prepared by dissolving 1 mol/l of $LiBF_4$ in propylene carbonate, was used as an electrolyte, and the above element was thoroughly impregnated with the electrolyte, whereupon the initial capacity was measured within a range of from 4.2 V to 3 V. Thereafter, a charge and discharge cycle test was carried out at a charge and discharge current of 10 mA within a range of from 4.2 V to 3 V, and the capacity after 1,000 cycles was measured, whereupon the change was calculated. The results are shown in Table 1.

EXAMPLE 2

A positive electrode assembly was prepared in the same manner as in Example 1 except that $LiMn_2O_4$ was used instead of $LiCoO_2$. The capacity was measured in the same manner as in Example 1 except that this positive electrode assembly was employed. The results are shown in Table 1.

EXAMPLE 3

A positive electrode assembly was obtained in the same manner as in Example 1 except that $LiNiO_2$ was employed instead of $LiCoO_2$. The capacity was measured in the same manner as in Example 1 except that this positive electrode assembly was employed. The results are shown in Table 1.

EXAMPLE 4

A positive electrode assembly was obtained in the same manner as in Example 1 except that $LiCo_{0.2}Ni_{0.8}O_2$ was used instead of $LiCoO_2$. The capacity was measured in the same manner as in Example 1 except that this positive electrode assembly was employed. The results are shown in Table 1.

EXAMPLE 5

A positive electrode assembly was obtained in the same manner as in Example 1 except that the activated carbon in the mixture was changed to 60 wt %, $LiCoO_2$ was changed to 20 wt %. The capacity was measured in the same manner as in Example 1 except that this positive electrode assembly was employed. The results are shown in Table 1.

EXAMPLE 6

A positive electrode assembly was obtained in the same manner as in Example 1 except that the activated carbon in the mixture was changed to 20 wt %, $LiCoO_2$ was changed to 60 wt %. The capacity was measured in the same manner as in Example 1 except that this positive electrode assembly was used. The results are shown in Table 1.

EXAMPLE 7

A positive electrode assembly was obtained in the same manner as in Example 1 except that no $LiCoO_2$ was added to the mixture, and the activated carbon was changed to 80 wt %. The capacity was measured in the same manner as in Example 1 except that this positive electrode assembly was employed. The results are shown in Table 1.

EXAMPLE 8

A positive electrode assembly was obtained in the same manner as in Example 1 except that no activated carbon was added to the mixture, and $LiCoO_2$ was changed to 80 wt %. The capacity was measured in the same manner as in Example 1 except that this positive electrode assembly was employed. The results are shown in Table 1.

EXAMPLE 9

A positive electrode assembly was prepared in the same manner as in Example 1 except that activated carbon having a specific surface area of 2,000 $m^2/g$ obtained by steam activation using a coconut shell as a starting material, instead of the phenol resin.

Then, a meso phase pitch base carbon material was heat-treated at 3,000° C. to obtain a carbon material having a spacing of [002] face of 0.337 nm and being capable of doping and undoping lithium ions. The carbon material was dispersed in a solution having polyamideimide dissolved in NMP, and coated on a copper foil treated by etching to a thickness of 20 $\mu$m, by a doctor blade method, followed by drying in air at 120° C. for two hours and then by heat treatment at 300° C. for two hours under a reduced pressure of 0.2 torr to obtain a negative electrode assembly. The thickness of the coated layer after drying was 100 $\mu$m, and the effective electrode area was 1 $cm^2$. The weight ratio of the carbon material to the polyamideimide was 9:1.

The positive electrode assembly and the negative electrode assembly were disposed to face each other with a propylene separator having a thickness of 25 $\mu$m interposed therebetween to obtain an element of 1 $cm^2$. A solution prepared by dissolving 1 mol/l of $LiBF_4$ in a mixed solvent of ethylene carbonate and propylene carbonate (volume ratio of 1:1), was used as an electrolyte, and the above element was thoroughly impregnated with the electrolyte, whereupon the initial capacity was measured within a range of from 4.2 V to 3 V. Then, a charge and discharge cycle test was carried out at a charge and discharge current of 10 mA within a range of from 4.2 V to 3 V, and the capacity after 10,000 cycles was measured, and the change was calculated. The results are shown in Table 2.

EXAMPLE 10

A positive electrode assembly was obtained in the same manner as in Example 9 except that $LiMn_2O_4$ was employed instead of $LiCoO_2$. The capacity was measured in the same manner as in Example 9 except that this positive electrode assembly was employed. The results are shown in Table 2.

EXAMPLE 11

A positive electrode assembly was obtained in the same manner as in Example 9 except that $LiNiO_2$ was employed instead of $LiCoO_2$. The capacity was measured in the same manner as in Example 9 except that this positive electrode assembly was employed. The results are shown in Table 2.

EXAMPLE 12

A positive electrode assembly was obtained in the same manner as in Example 1 except that $LiCo_{0.2}Ni_{0.8}O_2$ was employed instead of $LiCoO_2$. The capacity was measured in the same manner as in Example 9 except that this positive electrode assembly was employed. The results are shown in Table 2.

EXAMPLE 13

A positive electrode assembly was obtained in the same manner as in Example 9 except that the activated carbon in the mixture was changed to 60 wt %, and $LiCoO_2$ was changed to 20 wt %. The capacity was measured in the same manner as in Example 9 except that this positive electrode assembly was employed. The results are shown in Table 2.

EXAMPLE 14

A positive electrode assembly was obtained in the same manner as in Example 9 except that the activated carbon in the mixture was changed to 20 wt %, and $LiCoO_2$ was changed to 60 wt %. The capacity was measured in the same manner as in Example 9 except that this positive electrode assembly was employed. The results are shown in Table 2.

EXAMPLE 15

A positive electrode assembly was obtained in the same manner as in Example 9 except that the activated carbon in the mixture was changed to 70 wt %, and $LiCoO_2$ was changed to 10 wt %. Further, a negative electrode was obtained in the same manner as in Example 9 except that the thickness of the coating layer was changed to 50 $\mu$m. The capacity was measured in the same manner as in Example 9 except that these positive electrode and negative electrode were employed. The results are shown in Table 2.

EXAMPLE 16

A positive electrode assembly was obtained in the same manner as in Example 9 except that no $LiCoO_2$ was added to the mixture, and the activated carbon was changed to 80 wt %. The capacity was measured in the same manner as in Example 9 except that this positive electrode assembly was employed. The results are shown in Table 2.

EXAMPLE 17

A positive electrode assembly was obtained in the same manner as in Example 9 except that no activated carbon was added to the mixture, and $LiCoO_2$ was changed to 80 wt %. The capacity was measured in the same manner as in Example 9 except that this positive electrode assembly was employed. The results are shown in Table 2.

TABLE 1

|  | Change in capacity (%) |
| --- | --- |
| Example 1 | −7.8 |
| Example 2 | −9.3 |
| Example 3 | −9.8 |
| Example 4 | −9.5 |
| Example 5 | −7.6 |
| Example 6 | −8.9 |
| Example 7 | −28.9 |
| Example 8 | −25.3 |

TABLE 2

|  | Initial capacity (F) | Change in capacity (%) |
| --- | --- | --- |
| Example 9 | 1.22 | −10.7 |

TABLE 2-continued

|  | Initial capacity (F) | Change in capacity (%) |
| --- | --- | --- |
| Example 10 | 1.20 | −13.3 |
| Example 11 | 1.27 | −15.7 |
| Example 12 | 1.20 | −14.2 |
| Example 13 | 1.12 | −9.24 |
| Example 14 | 1.32 | −13.6 |
| Example 15 | 1.03 | −8.90 |
| Example 16 | 0.512 | −75.8 |
| Example 17 | 9.83 | −52.8 |

The secondary power source of the present invention has a high upper limit voltage and a large capacity. Further, at the positive electrode, activated carbon is involved for the quick charge and discharge, and the lithium-containing transition metal oxide is basically concerned with the charge and discharge by a low current or is not substantially concerned with the charge and discharge, whereby the secondary power source of the present invention is excellent in the charge and discharge cycle durability.

Further, it is not required to preliminarily carry out doping of lithium ions in the negative electrode carbon material by a chemical method or an electrochemical method during the preparation of the secondary power source, and such doping can be carried out by charging after preparation of the secondary power source. Accordingly, the preparation of the secondary power source is easy.

What is claimed is:

1. A secondary power source, which comprises a positive electrode comprising activated carbon and a lithium-containing transition metal oxide, a negative electrode comprising a carbon material capable of doping and undoping lithium ions, and an organic electrolyte comprising a lithium salt, wherein the lithium-containing transition metal oxide is an oxide of lithium and at least one element selected from the group consisting of Mn, Fe, Co, Ni, Zn, and W, and the lithium-containing transition metal oxide is present in the positive electrode in an amount of from 0.1 to 15 wt %.

2. The secondary power source according to claim 1, wherein the lithium-containing transition metal oxide is $Li_xCo_yNi_{1-y}O_2$ or $Li_zMn_2O_4$, wherein $0<x<2$, $0\leq y\leq 1$ and $0<z<2$.

3. The secondary power source according to claim 1, wherein the activated carbon of the positive electrode has a specific surface area of from 800 to 3,000 m²/g.

4. The secondary power source according to claim 1, wherein the activated carbon of the positive electrode is steam-activated coconut shell type activated carbon or steam-activated phenol resin type activated carbon.

5. The secondary power source according to claim 1, wherein the carbon material of the negative electrode has a spacing of [002] face of from 0.335 to 0.410 nm.

6. The secondary power source according to claim 1, wherein the carbon material of the negative electrode has a spacing of [002] face of from 0.335 to 0.338 nm.

7. The secondary power source according to claim 1, wherein the organic electrolyte comprises at least one solvent selected from the group consisting of ethylene carbonate, propylene carbonate, butylene carbonate, dimethyl carbonate, ethylmethyl carbonate, diethyl carbonate, sulfolane and dimethoxyethane.

8. The secondary power source according to claim 1, wherein the lithium salt is at least one member selected from the group consisting of $LiPF_6$, $LiBF_4$, $LiClO_4$, $LiN(SO_2CF_3)_2$, $CF_3SO_3Li$, $LiC(SO_2CF_3)_3$, $LiAsF_6$ and $LiSbF_6$.

9. The secondary power source according to claim 1, wherein the lithium salt is contained in an amount of from 0.1 to 2.5 mol/l in the electrolyte.

10. The secondary power source according to claim 1, wherein lithium ions are doped in the carbon material of the negative electrode by charging after the positive electrode and the negative electrode facing each other with a separator interposed therebetween, are impregnated with the electrolyte.

11. The secondary power source according to claim 1, wherein the positive electrode is one prepared by mixing and kneading polytetrafluoroethylene with a mixture comprising an activated carbon powder and a lithium-containing transition metal oxide powder, followed by forming into a sheet.

12. The secondary power source according to claim 1, wherein the positive electrode contains from 1 to 20 wt % of a binder.

13. The secondary power source according to claim 1, wherein the negative electrode is one prepared by mixing and kneading polytetrafluoroethylene with the carbon material, followed by forming into a sheet.

14. The secondary power source according to claim 1, wherein the negative electrode is one prepared by using polyvinylidene fluoride, polyamideimide or polyimide as a binder, dispersing the carbon material in a solution having a resin for the binder or its precursor dissolved in an organic solvent, coating the dispersion on a current collector, followed by heating.

* * * * *